(No Model.)

H. C. BATES & G. BRYANT.
LAND PULVERIZER.

No. 312,697. Patented Feb. 24, 1885.

WITNESSES:
Morris A. Clark,
G. B. Towles.

INVENTOR
Henry C. Bates
George Bryant
By M. Purris
Atty.

UNITED STATES PATENT OFFICE.

HENRY C. BATES, OF MILES, AND GEORGE BRYANT, OF IOWA, JACKSON COUNTY, IOWA.

LAND-PULVERIZER.

SPECIFICATION forming part of Letters Patent No. 312,697, dated February 24, 1885.

Application filed August 11, 1884. (No model.)

*To all whom it may concern:*

Be it known that we, HENRY C. BATES, a subject of Great Britain, residing at Miles, Jackson county, Iowa, and GEORGE BRYANT, a citizen of the United States of America, residing at Iowa, in the county of Jackson and State of Iowa, have invented certain new and useful Improvements in Land-Pulverizers, of which the following is a specification, reference being had therein to the accompanying drawings.

Our invention relates to clod-crushers and land-pulverizers; and it consists of a series of sections of rings interlocked together, each section being linked to jointed bars which are linked to an evener, as hereinafter fully set forth.

Figure 1:
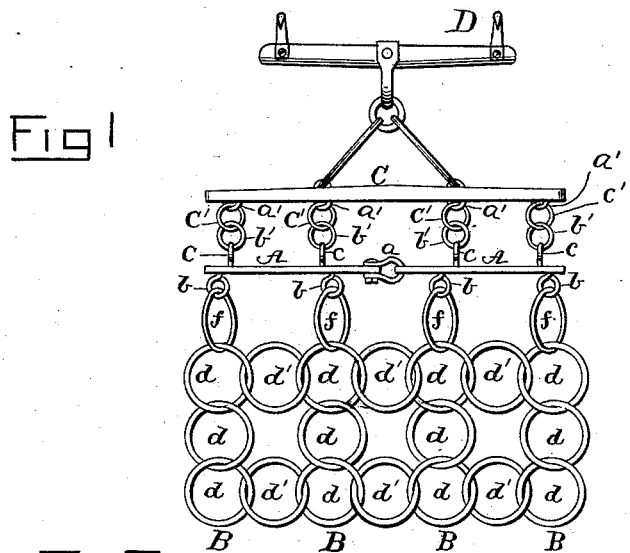
Figure 2:
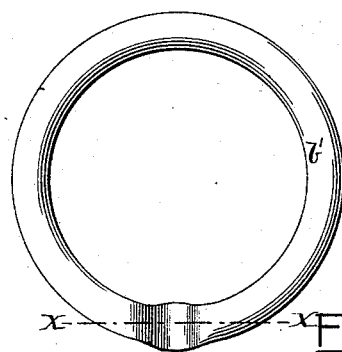
Figure 3:
Figure 4:
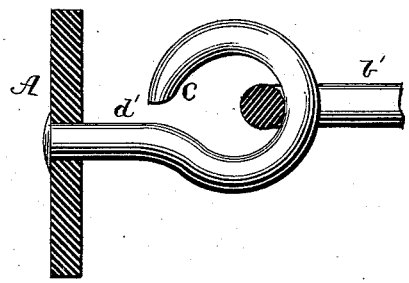

In the accompanying drawings, Figure 1 is a plan view of the crusher. Fig. 2 is an enlarged view of one of the rings detached which connect the jointed bars with the evener. Fig. 3 is a section on line $x$ $x$ of Fig. 2. Fig. 4 is an enlarged sectional view showing one of the connecting-hooks in elevation.

A designates bars connected together by clevis or link-joints $a$, and provided with eyes $b$ and hooks $c$.

B designates sections of rings $d$, which rings are interlocked together, and the sections are connected together in front and rear by the interlocking rings $d'$. Each section B of the rings is connected with the jointed bars A by means of links $f$, interlocked through the eyes $b$ and the forward links, $d$, as shown.

C designates an evener, to which is attached in any suitable manner the doubletree D. The evener is provided with eyes $a'$, and is connected with the bars A by means of the hooks $c$, inserted through the rings $b'$, which are interlocked with rings $c'$, which are interlocked with the eyes $a'$. The rings $b'$ are provided with depressions $b^2$ to allow them to be readily inserted on and removed from the hooks $c$, the opening $d'$ of which is less than the diameter of the ring, except at the depression.

It is evident that the size of the pulverizer may be varied by increasing or diminishing the number of the sections of the rings or the number of rings in each section and making the jointed bars and evener to correspond with the increased or diminished size of the crusher. The bars A should be short, and where the width of the crusher requires increased length of bars additional bars should be added, loosely jointed together, as shown, to allow the crusher and pulverizer to readily conform to the uneven surface of the ground.

We are aware that linked clod-crushers are not new; but heretofore the links of such crushers have been attached to bars at the sides and through the central portion of the net-work of the links, which bars prevent the crusher from conforming perfectly to the uneven surface of the ground, and thus hinder the operation of the crusher; and in such crushers the links have been oblong and not entirely circular, which oblong shape of links places a large portion of the sides of each link in right line with the movement of the crusher. It will be seen that our crusher is made of rings formed as nearly as practicable in a true circle, so that the largest portion possible of their surfaces may be in position to engage with and pulverize clods or lumps of manure; and our crusher being formed of the sections of those rings, and not connected with any rigid bars, will readily conform to the unevenness of the surface, and the links will readily drop into the depressions and engage with clods of earth or lumps of manure, pulverizing and evenly spreading the same over the ground. The rings $b'$ are provided with the depressions $b^2$, so that they may be placed over the hooks $c'$ by turning the depression to position where the point of the hook will pass, and then the ring being moved around so that the depression may not come in range with the point of the hook it will not be liable to become unhooked.

We are aware that links and devices provided with such depressions are not new, and we claim them only in the particular combination shown.

What we claim as new is—

In a crusher and pulverizer, the combination, with the jointed bars A, of a series of sections, B, of circular rings $d$, interlocked together, the sections of rings being connected laterally at the front and rear by the interlocking rings $d'$, and attached at the front to the jointed bars, substantially as and for the purpose described.

In testimony whereof we hereto affix our signatures in presence of two witnesses.

HENRY C. BATES.
GEORGE BRYANT.

Witnesses:
W. W. SANBORN,
M. E. LEASE.